(12) United States Patent
Yoshida et al.

(10) Patent No.: US 10,745,031 B2
(45) Date of Patent: *Aug. 18, 2020

(54) ALARM SYSTEM FOR VEHICLE

(71) Applicant: MAZDA MOTOR CORPORATION, Hiroshima (JP)

(72) Inventors: Yuki Yoshida, Hiroshima (JP); Koji Hirai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,927

(22) Filed: May 13, 2019

(65) Prior Publication Data
US 2019/0367048 A1 Dec. 5, 2019

(30) Foreign Application Priority Data
Jun. 1, 2018 (JP) ................. 2018-106370

(51) Int. Cl.
*B60Q 1/00* (2006.01)
*B60W 50/14* (2020.01)
(Continued)

(52) U.S. Cl.
CPC ........ *B60W 50/14* (2013.01); *B60W 30/0956* (2013.01); *G01S 13/931* (2013.01); *B60W 2050/143* (2013.01); *B60W 2420/52* (2013.01)

(58) Field of Classification Search
None
See application file for complete search history.

(56) References Cited

U.S. PATENT DOCUMENTS 5,483,453 A * 1/1996 Uemura ............... G05D 1/0246
180/179
6,566,999 B2 * 5/2003 Iwasaki ................... B60T 7/22
340/435
(Continued)

FOREIGN PATENT DOCUMENTS

EP 2814018 A1 12/2014
EP 2833335 A1 2/2015
(Continued)

OTHER PUBLICATIONS

Partial European Search Report issued by the European Patent Office dated Oct. 24, 2019, which corresponds to EP19174614.8-1203 and is related to U.S. Appl. No. 16/410,927.
(Continued)

*Primary Examiner* — Julie B Lieu
(74) *Attorney, Agent, or Firm* — Studebaker & Brackett PC

(57) ABSTRACT

To provide an alarm system for a vehicle that can reduce alarms that can irritate a driver. An alarm system 1 for a vehicle includes a determination and alarm part 52 that determines whether or not an object will cross a right alarm line 61 or a left alarm line 62 within a predetermined time and activates an alarm unit when it is determined that the object will cross the alarm line within the predetermined time. When the relative velocity of the object with respect to the right alarm line 61 or the left alarm line 62 is decreasing, the determination and alarm part 52 performs an alarm reduction control to reduce operation of the alarm unit compared with when the relative velocity is not decreasing.

15 Claims, 8 Drawing Sheets

(51) Int. Cl.
*B60W 30/095* (2012.01)
*G01S 13/931* (2020.01)

(56) References Cited

U.S. PATENT DOCUMENTS

| | | | |
|---|---|---|---|
| 2015/0046038 A1 | 2/2015 | Kawamata et al. | |
| 2016/0140847 A1* | 5/2016 | Kawamata | G08G 1/163 |
| | | | 701/36 |
| 2018/0118202 A1 | 5/2018 | Shimizu et al. | |
| 2018/0178721 A1* | 6/2018 | Ikedo | B60Q 1/346 |
| 2019/0033443 A1* | 1/2019 | Yoshikawa | G01S 13/931 |
| 2019/0176887 A1* | 6/2019 | Yasuda | G08G 1/16 |
| 2019/0366921 A1* | 12/2019 | Yoshida | B60Q 9/00 |
| 2019/0366924 A1* | 12/2019 | Yoshihara | B60Q 9/008 |
| 2019/0366925 A1* | 12/2019 | Yoshihara | G08G 1/166 |

FOREIGN PATENT DOCUMENTS

| | | |
|---|---|---|
| JP | 2012-160103 A | 8/2012 |
| WO | 2017/170979 A1 | 10/2017 |

OTHER PUBLICATIONS

The extended European search report issued by the European Patent Office dated Feb. 14, 2020, which corresponds to European Patent Application No. 19174614.8-1203 and is related to U.S. Appl. No. 16/410,927.

* cited by examiner

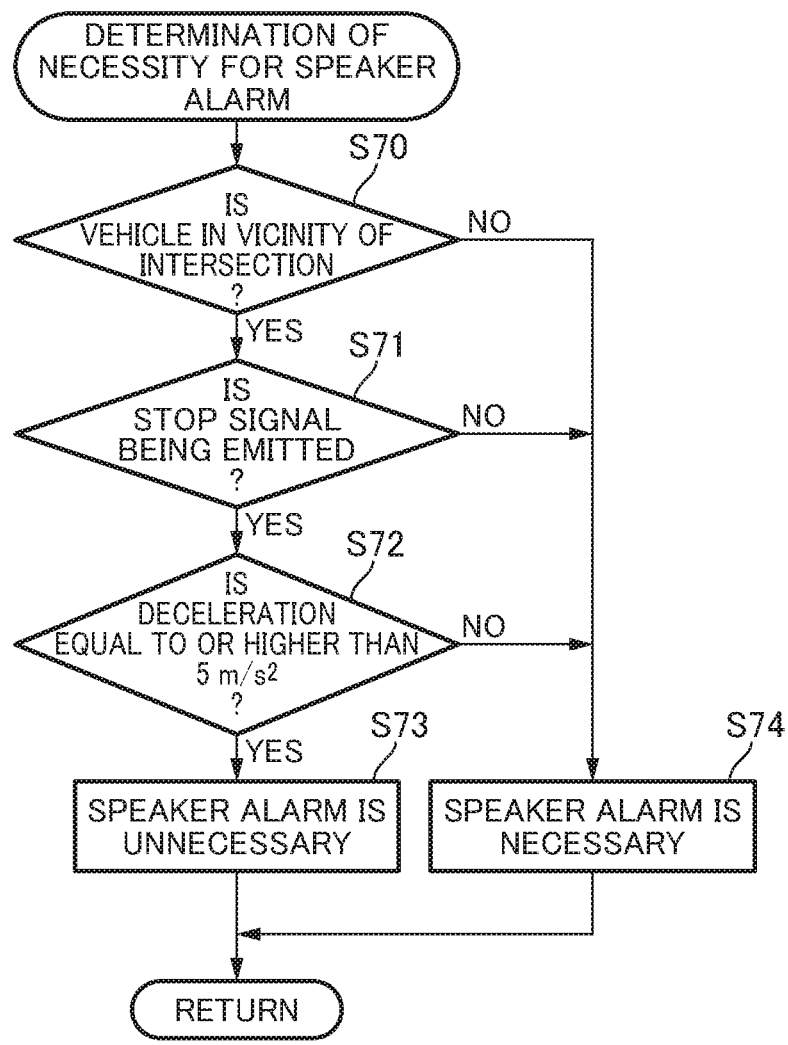

ALARM SYSTEM FOR VEHICLE

BACKGROUND OF THE INVENTION

Field of the Invention

The present invention relates to an alarm system for a vehicle. In particular, it relates to an alarm system for a vehicle that raises an alarm in response to an object approaching the vehicle.

Description of the Related Art

Systems that raise an alarm in response to an object approaching have been proposed. For example, Japanese Patent Laid-Open No. 2012-160103 discloses a system that determines the possibility of an object located at the side of a vehicle colliding with the vehicle based on the distance between the object and the vehicle or the relative velocity of the object with respect to the vehicle. When the system determines that the object can collide with the vehicle, the system raises an alarm to the driver of the vehicle.

The system described in Japanese Patent Laid-Open No. 2012-160103 determines the stopping distance of each object existing around the vehicle (that is, the distance the object moves before the object is stopped). The system activates an alarm unit when the stopping distance of an object is greater than the distance between the object and the vehicle. Such a system has an advantage that the system can alert the driver to an object that is less conspicuous to the driver to avoid collision with the object.

The system described in Japanese Patent Laid-Open No. 2012-160103 determines that an object around the vehicle can collide with the vehicle and raises an alarm when the object satisfies a physical condition relating to collision. However, such a system can raise a false alarm when the physical condition does not accurately reflect the actual possibility of collision. That is, even when the object is actually unlikely to collide with the vehicle, such a system can raise an alarm, and such an alarm can irritate the driver.

The present invention has been made to solve the problem described above, and an object of the present invention is to provide an alarm system for a vehicle that can reduce alarms that can irritate a driver.

SUMMARY OF THE INVENTION

In order to solve the problem described above, the present invention provides an alarm system for a vehicle, comprising: an object detection part that detects an object around the vehicle; and a determination and alarm part that sets an alarm line that extends forward from the vehicle, determines whether or not the object crosses the alarm line within a predetermined time, and activates an alarm unit when it is determined that the object crosses the alarm line within the predetermined time, wherein, when a relative velocity of the object with respect to the alarm line is decreasing, the determination and alarm part performs an alarm reduction control to reduce operation of the alarm unit compared with when the relative velocity is not decreasing.

For example, when the object is decelerating to temporarily stop, the possibility of the object colliding with the vehicle is lower than when the object is not decelerating. For this reason, with the arrangement described above, when the object is decelerating, the determination and alarm part performs the alarm reduction control to reduce operation of the alarm unit compared with when the object is not decelerating. As a result, more alarms can be raised to the driver when the possibility of the object colliding with the vehicle is relatively high, whereas alarms that can irritate the driver can be reduced when the possibility of the object colliding with the vehicle is relatively low.

According to the present invention, preferably, the alarm unit includes a first alarm device and a second alarm device; the determination and alarm part activates the first alarm device and the second alarm device when the relative velocity is not decreasing; and the determination and alarm part does not activate the first alarm device but activates the second alarm device as the alarm reduction control when the relative velocity is decreasing.

With this arrangement, when the object is decelerating (that is, when the possibility of the object colliding with the vehicle is relatively low), the determination and alarm part does not activate the first alarm device and thereby can reduce alarms that can irritate the driver.

According to the present invention, preferably, the first alarm device audibly raises an alarm; and the second alarm device visually raises an alarm.

An audible alarm is more likely to irritate the driver than a visual alarm. With the arrangement described above, when the object is decelerating (that is, when the possibility of the object colliding with the vehicle is relatively low), the audible alarm is not raised, so that the driver is less likely to be irritated by alarms.

According to the present invention, preferably, when a time to collision, which is a time required for the object to cross the alarm line, is equal to or less than the predetermined time, the determination and alarm part determines that the object crosses the alarm line within the predetermined time; then the determination and alarm part calculates the time to collision on an assumption that the object is moving at a constant velocity when the relative velocity is not decreasing; and the determination and alarm part calculates the time to collision on an assumption that the object is moving at a constant acceleration as the alarm reduction control when the relative velocity is decreasing.

With this arrangement, when the time to collision (abbreviated as "TTC", hereinafter) is equal to or less than the predetermined time, the determination and alarm part activates the alarm unit. The way of calculating the TTC varies with the relative velocity of the object with respect to the alarm line. Specifically, when the relative velocity is not decreasing, the TTC is calculated on the assumption that the object is moving at a constant velocity (the TTC thus calculated will be referred to also as "TTC1", hereinafter). On the other hand, when the relative velocity is decreasing, the TTC is calculated on the assumption that the object is moving at a constant acceleration (the TTC thus calculated will be referred to also as "TTC2", hereinafter). The TTC2, which reflects the decrease in relative velocity, is greater than the TTC1, which does not reflect the decrease in relative velocity.

Therefore, with the arrangement described above, when the relative velocity of the object with respect to the alarm line is decreasing, the determination and alarm part determines whether or not the object will cross the alarm line within the predetermined time based on the TTC2. Since the TTC2 is greater than the TTC1, when the relative velocity of the object with respect to the alarm line is decreasing, the object is less likely to be determined to cross the alarm line within the predetermined time than when the relative velocity is not decreasing. As a result, when the relative velocity of the object with respect to the alarm line is decreasing, the determination and alarm part reduces operation of the alarm unit and thereby can reduce alarms that can irritate the driver compared with when the relative velocity is not decreasing.

According to the present invention, preferably, the determination and alarm part sets a length of the alarm line at a first length when the relative velocity is not decreasing; and the determination and alarm part sets the length of the alarm line at a second length, which is shorter than the first length, as the alarm reduction control when the relative velocity is decreasing.

With this arrangement, when the relative velocity of the object with respect to the alarm line is decreasing, the alarm line is shorter than when the relative velocity is not decreasing. Therefore, when the relative velocity is decreasing, the object is less likely to be determined to cross the alarm line within the predetermined time than when the relative velocity is not decreasing. As a result, when the relative velocity is decreasing, the determination and alarm part reduces operation of the alarm unit and thereby can reduce alarms that can irritate the driver compared with when the relative velocity is not decreasing.

According to the present invention, preferably, the determination and alarm part performs the alarm reduction control when a deceleration of the object with respect to the alarm line is equal to or higher than a predetermined deceleration.

With this arrangement, the determination and alarm part can be prevented from reducing operation of the alarm unit in response to a slight decrease in velocity of the object and thereby failing to alert the driver.

According to the present invention, preferably, the alarm system for a vehicle further comprises a traffic signal detection part that detects a traffic signal emitted by a traffic light in the direction of traveling of the object, and the determination and alarm part performs the alarm reduction control when the traffic light is emitting a stop signal.

With this arrangement, when the object is decelerating in response to the stop signal, operation of the alarm unit can be reduced with reliability.

Advantages of the Invention

The present invention can provide an alarm system for a vehicle that can reduce alarms that can irritate a driver.

BRIEF DESCRIPTION OF THE DRAWINGS

FIG. 8 is a flowchart showing a process performed by the ECU of the alarm system for a vehicle according to the second embodiment.

DETAILED DESCRIPTION OF THE PREFERRED EMBODIMENTS

Figure 1:
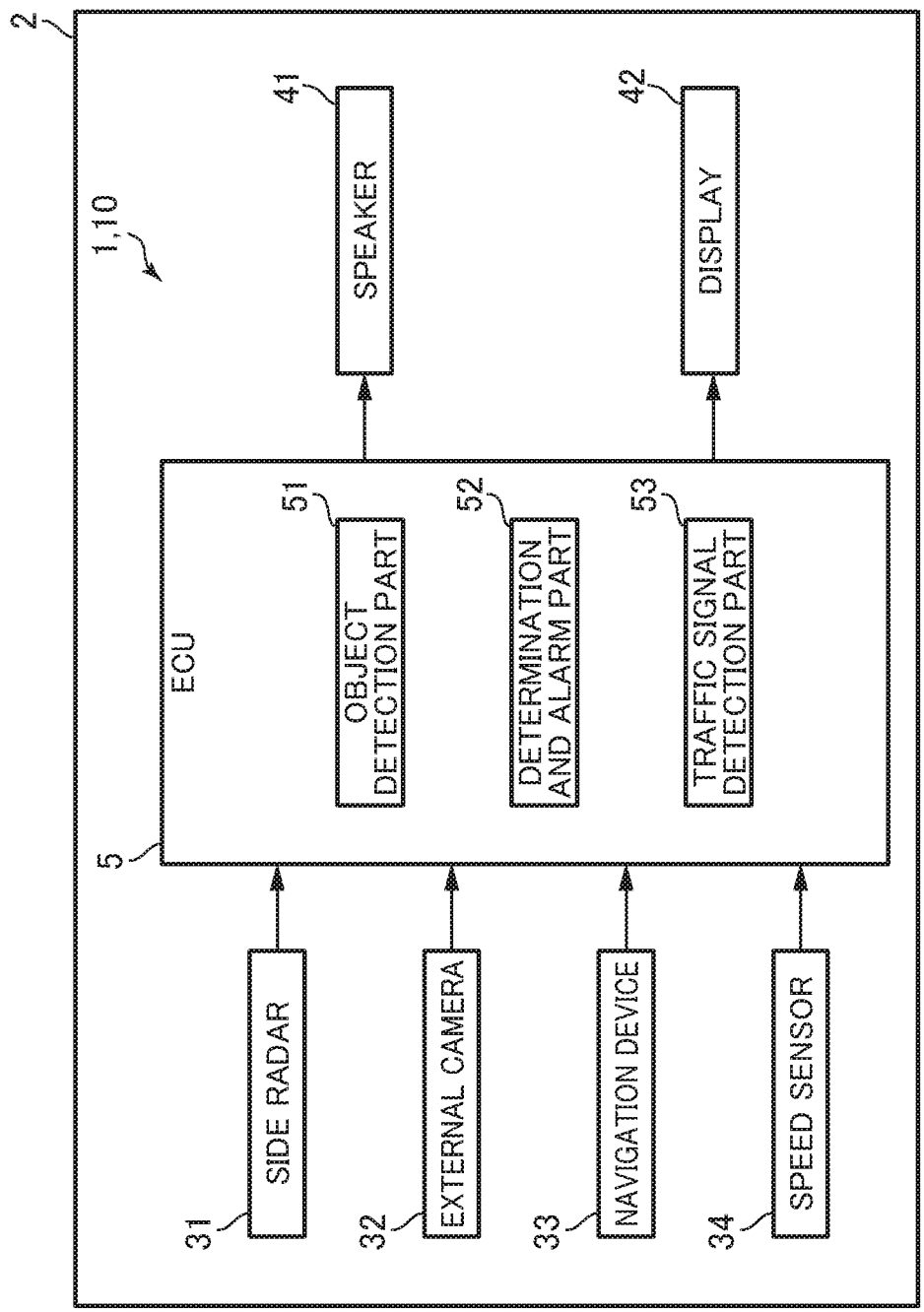
FIG. 1 is a block diagram showing an alarm system for a vehicle according to a first embodiment of the present invention.

In the following, embodiments will be described with reference to the accompanying drawings. To facilitate understanding of the description, the same components are denoted by like reference numerals throughout the drawings, and redundant descriptions thereof will be omitted.

First Embodiment

First, with reference to FIG. 1, a configuration of an alarm system 1 for a vehicle (referred to simply as an alarm system 1, hereinafter) according to a first embodiment will be described. FIG. 1 is a block diagram showing the alarm system 1.

The alarm system 1 is mounted on a vehicle and raises an alarm to the driver of the vehicle to alert the driver. In this specification, the vehicle on which the alarm system 1 is mounted will be referred to as a "vehicle 2". The alarm system for a vehicle according to the present invention can be applied not only to a four-wheeled vehicle but also to a two-wheeled vehicle.

In this specification, the direction in which the vehicle 2 runs forward is defined as "forward", and the direction in which the vehicle 2 runs backward is defined as "backward". The left side of the vehicle running forward is defined as "left", and the right side of the vehicle running forward is defined as "right".

The alarm system 1 includes a side radar 31, an external camera 32, a navigation device 33, and a speed sensor 34. The alarm system 1 further includes a speaker 41, a display 42 and an electronic control unit (ECU) 5.

The side radar 31 is used to detect the presence of an object outside of the vehicle 2, the velocity of the object, and the distance between the object and an alarm line, which will be described later. Detectable objects include a vehicle, a structure fixed on a road, and a pedestrian, for example. The vehicle is not limited to a four-wheeled vehicle but may be any running body, such as a two-wheeled vehicle or a bicycle. As described later, the detections described above performed by the side radar 31 are targeted to an object in a detection region set at a side of the vehicle 2. The side radar 31 is a millimeter wave radar (which has an operating frequency of 76 GHz to 77 GHz), for example, and has antennas directed to the left and right of the vehicle 2. Each antenna may be a single antenna used for both transmission and reception or a set of a transmitting antenna element and a receiving antenna element. The side radar 31 transmits a measuring wave from the antennas to the sides of the vehicle 2 and receives a reflection wave from an object. The side radar 31 transmits a signal corresponding to the received reflection wave to the ECU 5.

The external camera 32 takes an image of a range including the detection region of the side radar 31 and obtains image information. The external camera 32 is an image sensor, for example, and is installed on a rear view mirror (not shown) or the like of the vehicle 2. The external camera 32 transmits a signal corresponding to the obtained image information.

The navigation device 33 provides predetermined information to a passenger of the vehicle 2. The navigation device 33 stores map information or obtains map information by communicating with a server outside the vehicle 2. The map information includes information about roads, intersections, traffic lights, buildings or the like. The navigation device 33 has a sensor that detects the location of the vehicle 2, such as a global positioning system (GPS) sensor or a self-contained navigation sensor. The navigation device 33 determines the location of the vehicle 2 on a map, audibly or visually provides information about the location, and transmits a signal corresponding to the information to the ECU 5. The "intersections" include not only crossroads but also T junctions, roundabout intersections and the like.

The speed sensor 34 detects the velocity of the vehicle 2. The speed sensor 34 determines the velocity of the vehicle 2 based on the rotational speed of a wheel (not shown) of the vehicle 2, the engine speed or the like, and transmits a signal corresponding to the velocity to the ECU 5.

The speaker 41 and the display 42 are examples of alarm devices of an alarm unit according to the present invention. More specifically, the speaker 41 is an example of a first alarm device according to the present invention, and the display 42 is an example of a second alarm device according to the present invention. The speaker 41 operates based on a received control signal and raises an alarm by outputting an alarm or other sound. The display 42 is a liquid crystal panel, for example. The display 42 operates based on a received control signal and raises an alarm by displaying a picture, text or the like.

The ECU 5 is a controller that controls equipment by transmitting and receiving signals. The ECU 5 may be partially or wholly formed by an analog circuit or formed as a digital processor. The ECU 5 includes an object detection part 51, a determination and alarm part 52, and a traffic signal detection part 53.

FIG. 1 shows functions of the ECU 5 in the form of blocks. However, the analog circuit or the software module incorporated in the digital processor of the ECU 5 is not necessarily divided as shown in FIG. 1. That is, the functional blocks shown in FIG. 1 may be further divided, or some of the functional blocks may be integrated into a single functional block. Those skilled in the art can modify the internal configuration of the ECU 5 as appropriate, as far as the processes described later can be performed.

The object detection part 51 detects the direction of movement of an object outside the vehicle 2, the distance of the object from an alarm line, the relative velocity of the object with respect to the alarm line, and the relative acceleration of the object with respect to the alarm line. Specifically, the object detection part 51 performs a predetermined calculation based on a signal received from the side radar 31 and performs the detections based on the calculation result.

The determination and alarm part 52 sets an alarm line. The alarm line is a virtual line set in the vicinity of the vehicle 2, which is used for determination of collision. The alarm line will be described in more detail later.

The determination and alarm part 52 also performs determination of collision. In determination of collision, it is determined whether or not an object outside the vehicle 2 will cross the alarm line within a predetermined time. The determination of collision will be described in more detail later.

The determination and alarm part 52 further transmits a control signal to the speaker 41 or the display 42 based on the result of the determination of collision. Specifically, the determination and alarm part 52 transmits a control signal to activate the speaker 41 or the display 42 when the determination and alarm part 52 determines that the object can collide with the vehicle 2.

The traffic signal detection part 53 detects a traffic signal emitted by a traffic light. Specifically, when there is an object outside the vehicle 2, and there is a traffic light in the direction of traveling of the object, the traffic signal detection part 53 detects the traffic signal emitted by the traffic light. The traffic signal detection part 53 determines the location of the traffic light located in the direction of traveling of the object based on a signal received from the external camera 32 or the navigation device 33. The traffic signal detection part 53 further detects the signal emitted by the traffic light based on the image information obtained by the external camera 32. The detection of the signal emitted by the traffic light can be achieved by various techniques, such as pattern matching. The determination of the location of the traffic light and the detection of the signal can be achieved by other various techniques, such as road-to-vehicle communication or vehicle-to-vehicle communication.

Figure 2:
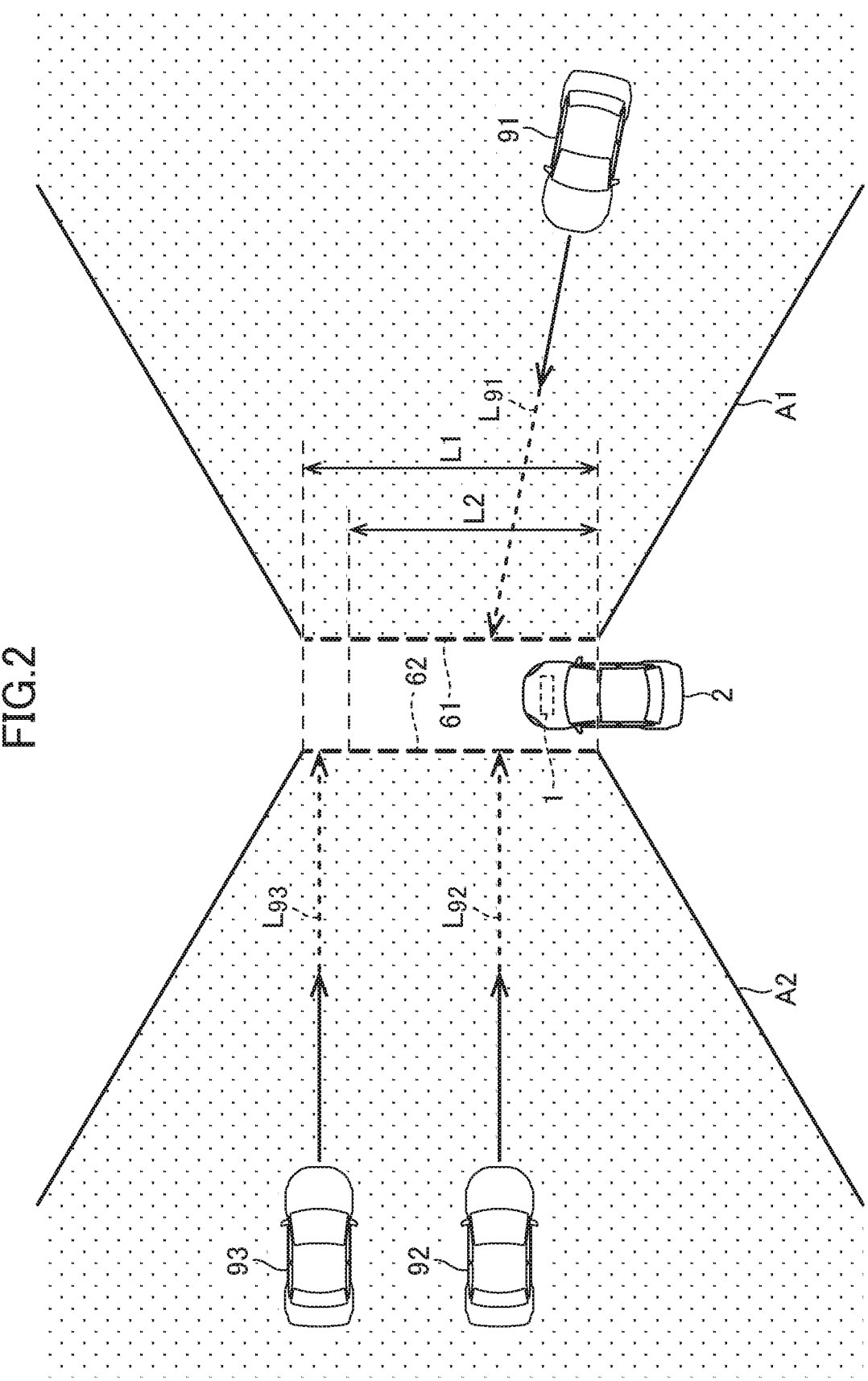
FIG. 2 is a diagram for illustrating determination of collision performed by the alarm system for a vehicle shown in FIG. 1.

Next, with reference to FIG. 2, the determination of collision performed by the alarm system 1 will be described. FIG. 2 is a diagram for illustrating the determination of collision performed by the alarm system 1.

When the vehicle 2 is stopped or running at a relatively low velocity (10 km/h or less, for example), the determination and alarm part 52 (see FIG. 1) of the ECU 5 sets a right alarm line 61 and a left alarm line 62, as shown in FIG. 2. The right alarm line 61 and the left alarm line 62 are invisible virtual lines. The right alarm line 61 is set at a predetermined distance (1 m or less, for example) in the right direction from the right edge of the vehicle 2, and the left alarm line 62 is set at a predetermined distance (1 m or less, for example) in the left direction from the left edge of the vehicle 2. That is, the distance between the right alarm line 61 and the left alarm line 62 is greater than the width of the vehicle 2.

The right alarm line 61 and the left alarm line 62 extend in the forward direction of the vehicle 2 from a base line BL as a base end. The base line BL is a virtual line set rearward from the front edge of the vehicle 2 by a predetermined distance (2 m, for example). The right alarm line 61 and the left alarm line 62 extend straight substantially in parallel with each other in the longitudinal direction of the vehicle 2.

The object detection part 51 (see FIG. 1) of the ECU 5 sets a detection region A1 at the right side of the right alarm line 61, and a detection region A2 at the left side of the left alarm line 62. The detection region A1 is defined by the right alarm line 61, a line at a predetermined distance in the right direction from the right alarm line 61, and lines extending from the right alarm line 61 at approximately 135° with respect to the right alarm line 61. The detection region A2 is defined by the left alarm line 62, a line at a predetermined distance in the left direction from the left alarm line 62, and lines extending from the left alarm line 62 at approximately 135° with respect to the left alarm line 62. The object detection part 51 detects an object in the detection regions A1 and A2 based on the signal received from the side radar 31.

In the following, the determination of collision of another vehicle 91 in the detection region A1 approaching the vehicle 2 will be described. When a virtual line $L_{91}$ extending in the direction of movement of the other vehicle 91 intersects with the right alarm line 61, the determination and alarm part 52 (see FIG. 1) of the ECU 5 calculates a time to collision (TTC) for the other vehicle 91 with respect to the right alarm line 61 based on information detected by the object detection part 51.

The determination and alarm part 52 can calculate the TTC for an object in the detection regions A1 and A2 in two ways. First, provided that the distance between the object and the right alarm line 61 or the left alarm line 62 is defined as $L_0$, and the relative velocity of the object with respect to the alarm line is defined as $V_0$, the determination and alarm part 52 can calculate the TTC according to the formula f1. The relative velocity $V_0$ of the object is positive when the object is approaching the alarm line. The formula f1 is derived from the equation of motion on the condition that the object is moving at a constant velocity.

[Formula 1]

$$TTC = \frac{L_0}{V_0} \quad (f1)$$

When the relative velocity of the object with respect to the right alarm line 61 or the left alarm line 62 is decreasing, the determination and alarm part 52 can calculate the TTC in such a manner that the TTC reflects the decrease in relative velocity. That is, provided that the distance between the object and the right alarm line 61 or the left alarm line 62 is defined as $L_0$, the relative velocity of the object with respect to the alarm line is defined as $V_0$, and the relative acceleration of the object with respect to the alarm line is $a_0$, the determination and alarm part 52 can calculate the TTC according to the formula f2. The relative velocity $V_0$ of the object is positive when the object is approaching the alarm line. The formula f2 is derived from the equation of motion on the condition that the object is moving at a constant acceleration.

[Formula 2]

$$TTC = \frac{-V_0 + \sqrt{V_0^2 - 2a_0 L_0}}{a_0} \quad (f2)$$

The determination and alarm part 52 determines whether or not the other vehicle 91 will cross the right alarm line 61 within a predetermined time based on the TTC calculated according to the formula f1 or f2. Specifically, when the TTC is equal to or less than a preset threshold (2 seconds, for example), the determination and alarm part 52 determines that the other vehicle 91 will cross the right alarm line 61 within a predetermined time (2 seconds, for example). Then, the other vehicle 91 can collide with the vehicle 2.

As described above, the alarm system 1 determines whether the object at the right side of the vehicle 2 can collide with the vehicle 2 or not with respect to the right alarm line 61. Similarly, the alarm system 1 determines whether the object at the left side of the vehicle 2 can collide with the vehicle 2 or not with respect to the left alarm line 62.

The determination and alarm part 52 can set the length of the right alarm line 61 and the left alarm line 62 at L1 (7 m, for example). L1 is an example of a first length according to the present invention. The determination and alarm part 52 can also set the length of the right alarm line 61 and the left alarm line 62 at L2 (5 m, for example), which is shorter than L1 (that is, L2<L1). L2 is an example of a second length according to the present invention.

Such a change in length of the right alarm line 61 and the left alarm line 62 has an effect on the determination of collision. As an example, the determination of collision in a case where other vehicles 92 and 93 in the detection region A2 are approaching the left alarm line 62 will be described. When the length of the left alarm line 62 is set at L1, both virtual lines $L_{92}$ and $L_{93}$ extending in the direction of traveling of the other vehicles 92 and 93 intersect with the left alarm line 62. Therefore, the determination and alarm part 52 performs the determination of collision of the other vehicles 92 and 93.

However, when the length of the left alarm line 62 is set at L2, the virtual line $L_{93}$ extending in the direction of traveling of the other vehicle 93 does not intersect with the left alarm line 62. Therefore, the determination and alarm part 52 does not perform the determination of collision of the other vehicle 93 and performs only the determination of collision of the other vehicle 92. That is, the determination and alarm part 52 does not activate the speaker 41 or the display 42 (see FIG. 1) in response to the other vehicle 93 approaching.

The alarm system 1 configured described above is particularly advantageous in a situation where there is a blind spot for the driver of the vehicle 2. An example of the situation where there is a blind spot for the driver is a situation where there is a wall near the lane in which the vehicle is running or a situation where there is another vehicle parked around the vehicle 2. That is, when an object in the blind spot is approaching the vehicle 2 and can collide with the vehicle 2, at least one of the speaker 41 and the display 42 raises an alarm to alert the driver to the object so that the driver can operate the vehicle to avoid collision.

Figure 3:
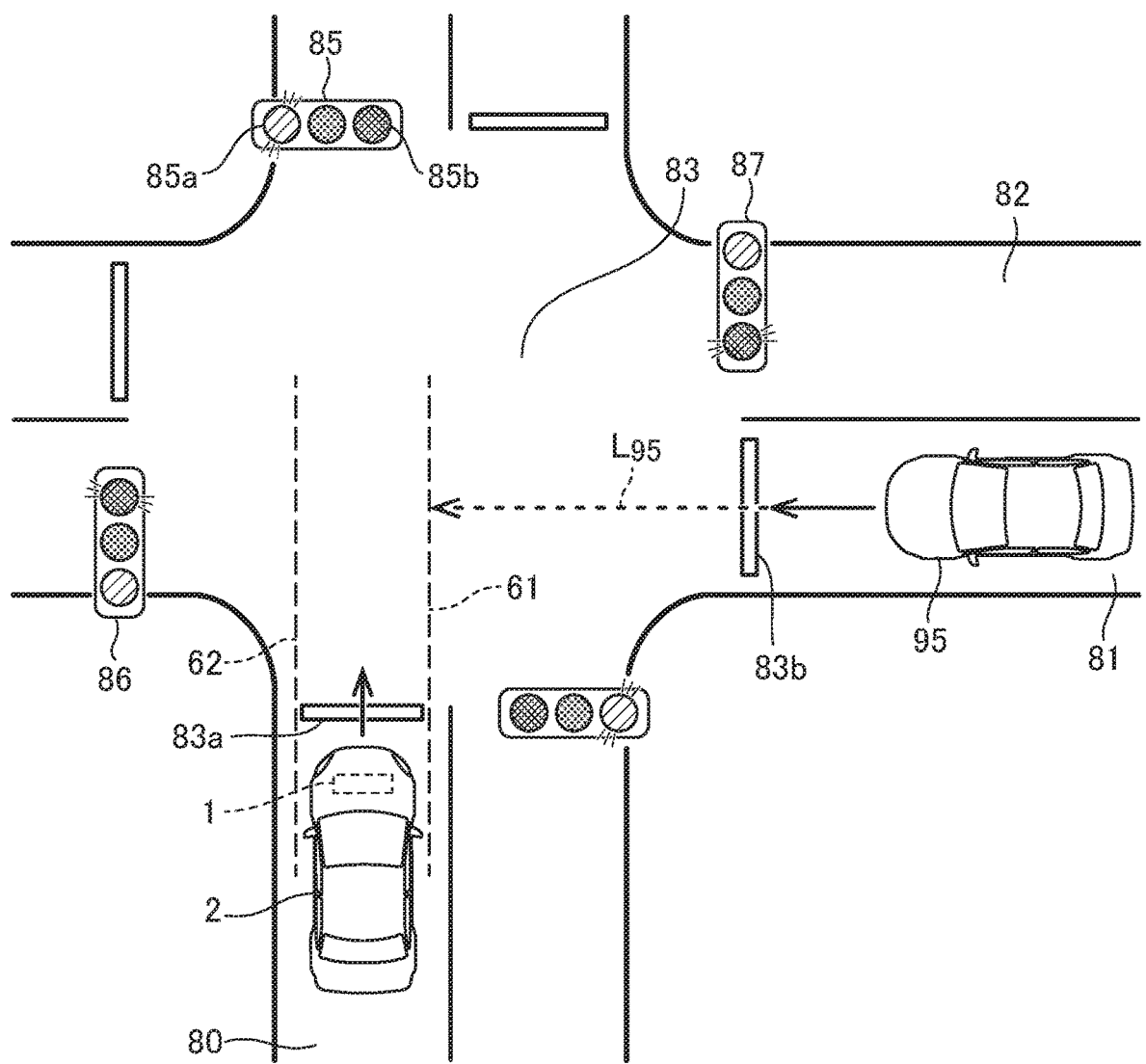
FIG. 3 is a diagram for illustrating determination of collision at an intersection.

Next, with reference to FIG. 3, determination of collision at an intersection will be described. FIG. 3 is a diagram for illustrating determination of collision at an intersection 83. As an example, FIG. 3 shows a situation where the traffic laws prescribe that vehicles run in the left lane, such as in Japan.

At the intersection 83, a lane 80 intersects with lanes 81 and 82. In the following description, the lane 81, which is closer to the vehicle 2 when the vehicle 2 enters the intersection 83, will be referred to as the "first lane 81", and the opposite lane to the first lane 81 will be referred to as the "second lane 82".

Consider a case where the vehicle 2 is stopped at a stop line 83a in the lane 80 as shown in FIG. 3. There is a traffic light 85 in the direction of traveling of the vehicle 2, and a lamp 85b of the traffic light 85 is emitting a stop signal (the so-called "red signal").

When the lamp 85b of the traffic light 85 is turned off, a lamp 85a is then turned on and emits a signal (the so-called "green signal") that allows the vehicles in the lane 80 to move. In response to this, the vehicle 2 starts and enters the intersection 83.

At this point, traffic lights 86 and 87 along the first lane 81 and the second lane 82 are probably emitting the stop signal. When the traffic lights 86 and 87 are emitting the stop signal, another vehicle 95 running in the first lane 81 and approaching the intersection 83 decelerates to stop at a stop line 83b. Even in this case, however, a virtual line $L_{95}$ extending in the direction of traveling of the other vehicle 95 may intersect with the right alarm line 61.

When the virtual line intersects with the right alarm line 61, the alarm system 1 calculates the TTC for the other vehicle 95. When the TTC is equal to or less than a threshold, the alarm system 1 determines that the other vehicle 95 can cross the right alarm line 61 within a predetermined time. That is, the alarm system 1 determines that the other vehicle 95 can collide with the vehicle 2 and raises an alarm to the driver of the vehicle 2.

However, such an approach of the other vehicle 95 to the vehicle 2 is inevitable because of the structure of the intersection 83 and does not necessarily lead to collision of the other vehicle 95 with the vehicle 2 with high possibility. In particular, when the other vehicle 95 decelerates to stop at the stop line 83b as in this example, the possibility of the other vehicle 95 colliding with the vehicle 2 is very low. When the alarm system 1 raises an alarm to alert the driver to the other vehicle 95 in this case, the alarm may irritate the driver. For this reason, when the other vehicle is decelerating, the alarm system 1 performs an alarm reduction control to suppress the operation of the speaker 41 compared with when the other vehicle 95 is not decelerating.

Figure 4:
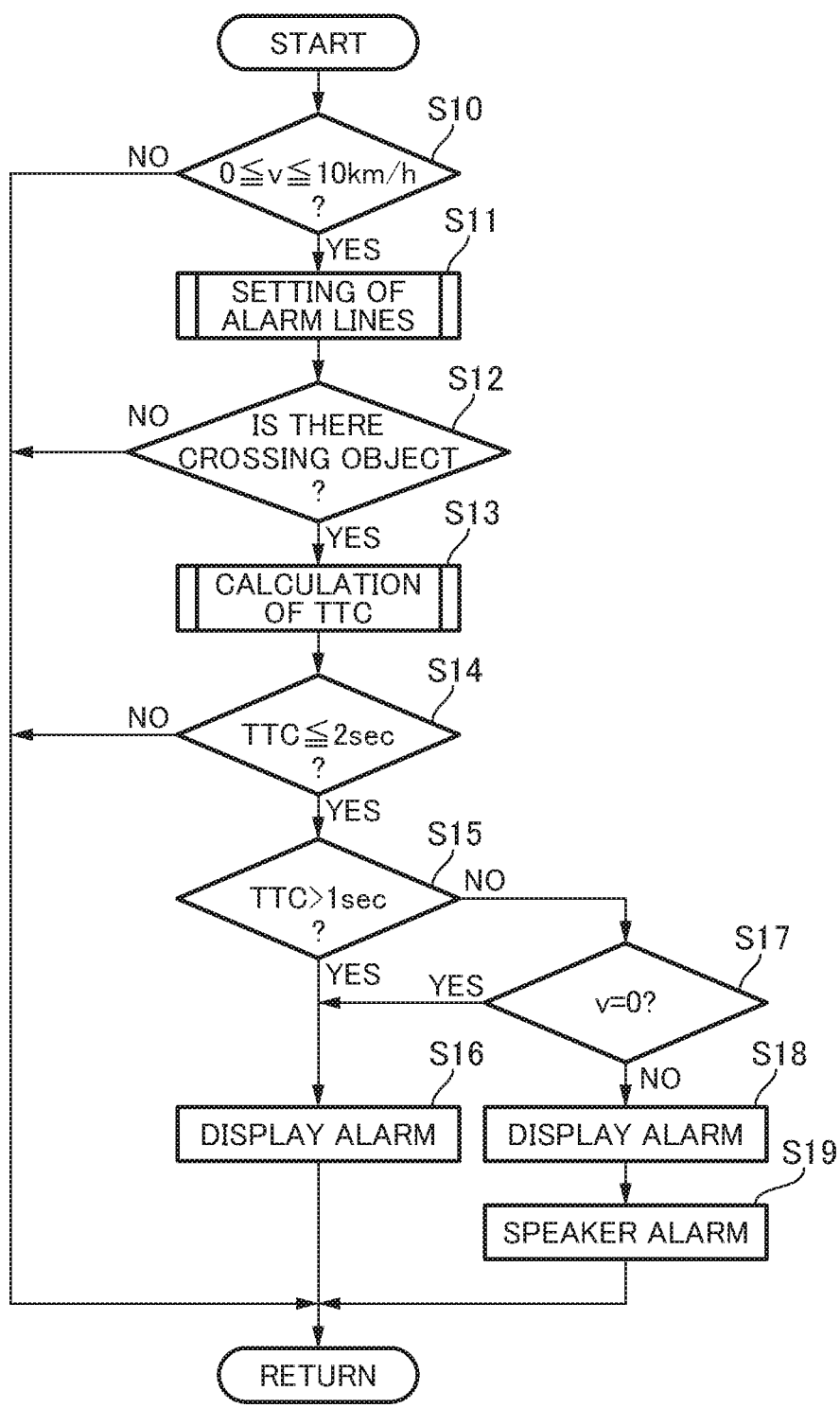
FIG. 4 is a flowchart showing a process performed by an ECU shown in FIG. 1.
Figure 5:
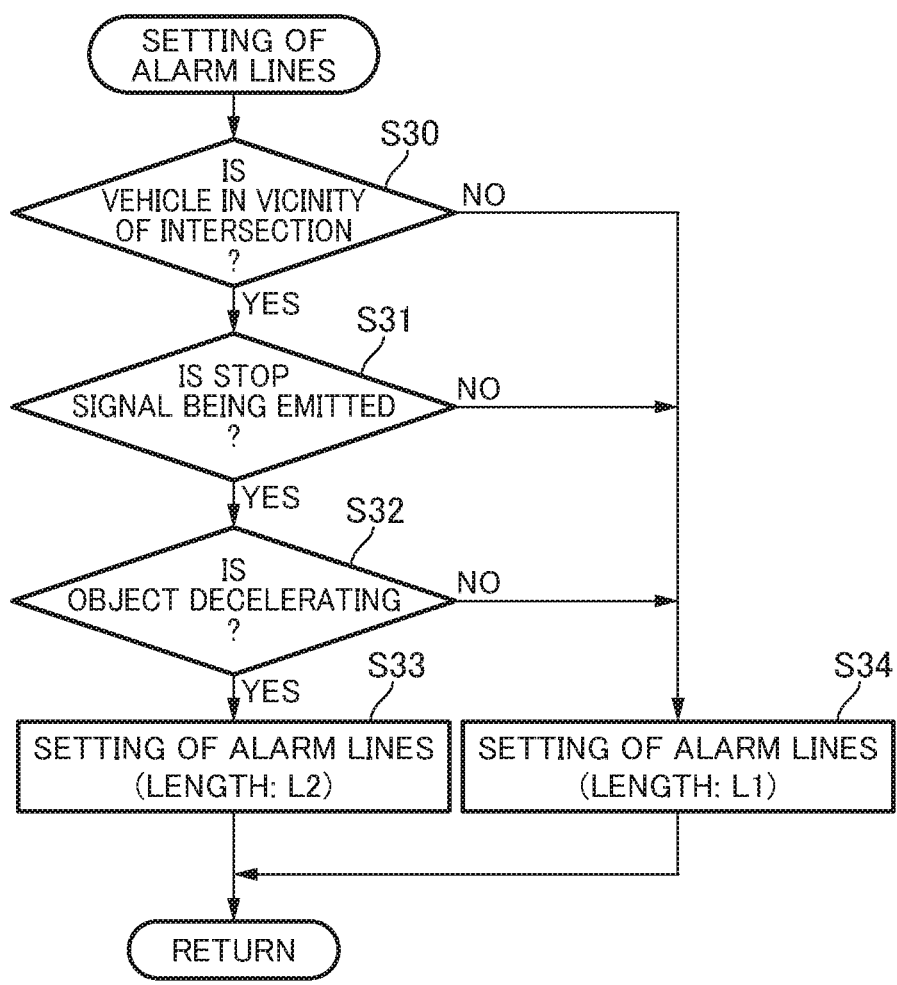
FIG. 5 is a flowchart showing a process performed by the ECU shown in FIG. 1.
Figure 6:
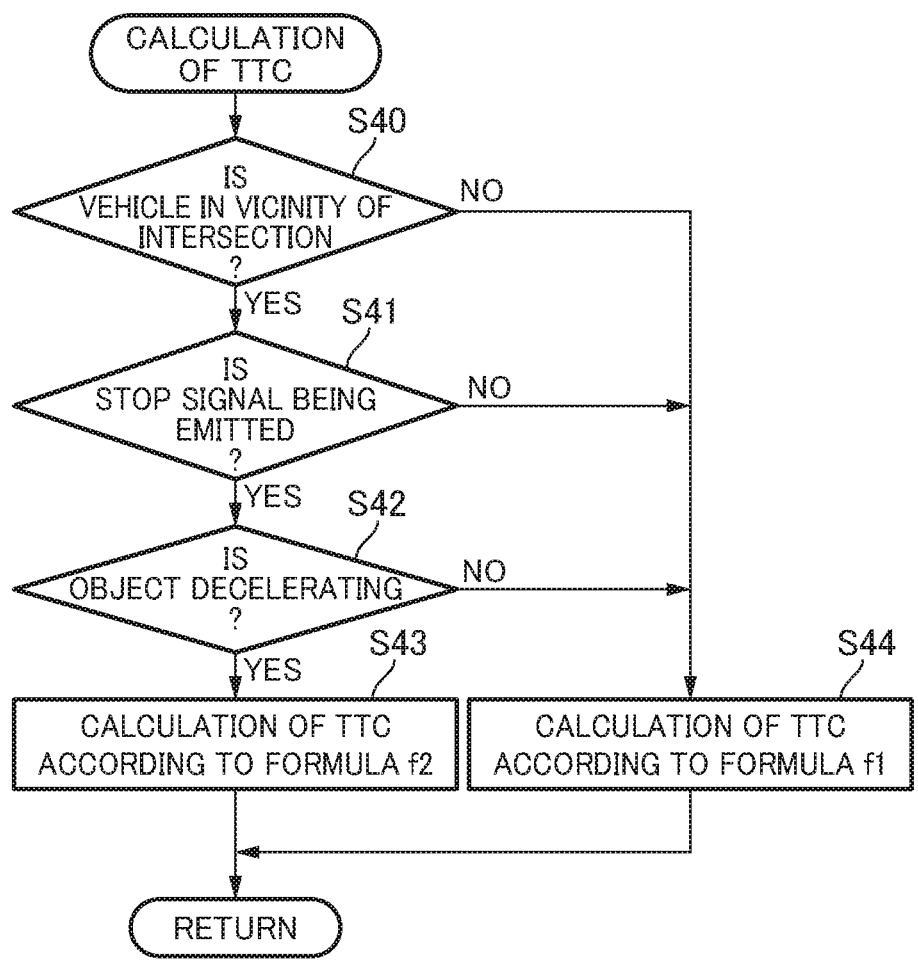
FIG. 6 is a flowchart showing a process performed by the ECU shown in FIG. 1.

Next, with reference to FIGS. 4 to 6, processes performed by the ECU 5 (see FIG. 1) will be described. FIGS. 4 to 6 are flowcharts showing processes performed by the ECU 5. The processes are repeatedly performed at a predetermined period. In the following description, for ease of explanation, any processing that is performed by a functional block of the ECU 5 in a strict sense will be described as being performed by the ECU 5.

First, in Step S10 shown in FIG. 4, the ECU 5 determines whether or not the velocity v of the vehicle 2 falls within a range from 0 km/h to 10 km/h inclusive. The ECU 5 determines the velocity v of the vehicle 2 based on the signal received from the speed sensor 34 (see FIG. 1). When it is determined that the velocity v falls within the range (YES in Step S10), the ECU 5 proceeds to Step S11.

In Step S11, the ECU 5 sets the alarm lines. With reference to FIG. 5, a process of the ECU 5 setting the alarm lines will be described.

In Step S30 shown in FIG. 5, the ECU 5 determines whether or not the vehicle 2 is located in the vicinity of an intersection. The ECU 5 performs the determination based on the signal received from the external camera 32 or the navigation device 33 (see FIG. 1). When it is determined that the vehicle 2 is located in the vicinity of an intersection (YES in Step S30), the ECU 5 proceeds to Step S31.

In Step S31, the ECU 5 determines whether or not a traffic light in the direction of traveling of an object (see the traffic lights 86 and 87 in FIG. 3) is emitting the stop signal. The ECU 5 performs the determination based on the signal received from the external camera 32 or the navigation device 33 (see FIG. 1). When it is determined that the traffic light is emitting the stop signal (YES in Step S31), the ECU 5 proceeds to Step S32.

In Step S32, the ECU 5 determines whether or not the object is decelerating. The ECU 5 performs the determination based on the signal received from the side radar 31 (see FIG. 1). When the traffic light in the direction of traveling of the object is emitting the stop signal (YES in Step S31) and the object is decelerating, the object is highly likely to stop at the intersection. When it is determined that the object is decelerating (YES in Step S32), the ECU 5 proceeds to Step S33. In Step S33, the ECU 5 sets the length of the right alarm line 61 and the left alarm line 62 at L2 (see FIG. 2).

On the other hand, when it is determined in Step S30 that the vehicle 2 is not located in the vicinity of an intersection (NO in Step S30), when it is determined in Step S31 that the traffic light in the direction of traveling of the object is not emitting the stop signal (NO in Step S31), or when it is determined in Step S32 that the object is not decelerating (NO in Step S32), the ECU 5 proceeds to Step S34. In Step S34, the ECU 5 sets the length of the right alarm line 61 and the left alarm line 62 at L1 (see FIG. 2).

Referring to FIG. 4 again, the process performed by the ECU 5 will be described. After completing setting of the right alarm line 61 and the left alarm line 62 in Step S11, the ECU 5 proceeds to Step S12.

In Step S12, the ECU 5 determines whether or not, in the detection region A1 or the detection region A2 (see FIG. 2), there is an object (referred to simply as a "crossing object", hereinafter) whose virtual line extending in the direction of traveling thereof intersects with the right alarm line 61 or the left alarm line 62. The ECU 5 performs the determination based on the signal received from the side radar 31 (see FIG. 1). When it is determined that there is a crossing object (YES in Step S12), the ECU 5 proceeds to Step S13.

In Step S13, the ECU 5 calculates the TTC for the crossing object. With reference to FIG. 6, a process of the ECU 5 calculating the TTC will be described.

In Step S40 shown in FIG. 6, the ECU 5 determines whether or not the vehicle 2 is located in the vicinity of an intersection. The ECU 5 performs the determination based on the signal received from the external camera 32 or the navigation device 33 (see FIG. 1). When it is determined that the vehicle 2 is located in the vicinity of an intersection (YES in Step S40), the ECU 5 proceeds to Step S41.

In Step S41, the ECU 5 determines whether or not a traffic light in the direction of traveling of a crossing object (see the traffic lights 86 and 87 in FIG. 3) is emitting the stop signal. The ECU 5 performs the determination based on the signal received from the external camera 32 or the navigation device 33 (see FIG. 1). When it is determined that the traffic light is emitting the stop signal (YES in Step S41), the ECU 5 proceeds to Step S42.

In Step S42, the ECU 5 determines whether or not the crossing object is decelerating. The ECU 5 performs the determination based on the signal received from the side radar 31 (see FIG. 1). When it is determined that the traffic light in the direction of traveling of the object is emitting the stop signal (YES in Step S41) and the object is decelerating, the object is considered to stop at the intersection. When it is determined that the object is decelerating (YES in Step S42), the ECU 5 proceeds to Step S43. In Step S43, the ECU 5 calculates the TTC according to the formula f2 described above (the TTC calculated according to the formula f2 will be referred to also as a "TTC2", hereinafter).

On the other hand, when it is determined in Step S40 that the vehicle 2 is not located in the vicinity of an intersection (NO in Step S40), when it is determined in Step S41 that the traffic light in the direction of traveling of the crossing object is not emitting the stop signal (NO in Step S41), or when it is determined in Step S42 that the crossing object is not decelerating (NO in Step S42), the ECU 5 proceeds to Step S44. In Step S44, the ECU 5 calculates the TTC according to the formula f1 described above (the TTC calculated according to the formula f1 will be referred to also as a "TTC1", hereinafter).

As described above, the ECU 5 selectively calculates the TTC1 or TTC2 based on the behavior of the crossing object. The TTC2, which reflects the decrease in relative velocity, is greater than the TTC1, which does not reflect the decrease in relative velocity.

According to the first embodiment, the control of setting the right alarm line 61 and the left alarm line 62 at L2 (S11) and calculating the time to collision according to the formula f2 when the relative velocity of the object is decreasing and the traffic light is emitting the stop signal as described above is referred to as the "alarm reduction control".

Referring to FIG. 4 again, the process performed by the ECU 5 will be described. After completing calculation of the TTC in Step S13, the ECU 5 proceeds to Step S14.

In Step S14, the ECU 5 determines whether or not the TTC calculated in Step S13 is equal to or less than 2 seconds. When it is determined that the TTC is equal to or less than 2 seconds (YES in Step S14), the ECU 5 proceeds to Step S15.

In Step S15, the ECU 5 determines whether or not the TTC calculated in Step S13 is more than 1 second. When the TTC is more than 1 second, the necessity for alarm is relatively low. When it is determined that the TTC is more than 1 second (YES in Step S15), the ECU 5 proceeds to Step S16.

In Step S16, the ECU 5 activates the display 42 (see FIG. 1). Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, when the TTC is equal to or less than 2 seconds (YES in Step S14) and more than 1 second (YES in Step S15), the necessity for alarm is relatively low, so that the ECU 5 does not activate the speaker 41 (see FIG. 1) but activates the display 42 to raise an alarm to the driver of the vehicle 2.

On the other hand, when the TTC is equal to or less than 1 second, the necessity for alarm is relatively high. When it is determined in Step S15 that the TTC calculated in Step S13 is not more than 1 second (NO in Step S15), the ECU 5 proceeds to Step S17.

In Step S17, the ECU 5 determines whether or not the velocity v of the vehicle 2 is 0 km/h. In other words, the ECU 5 determines whether or not the vehicle 2 is stopped. When the vehicle 2 is stopped, the necessity for alarm is relatively low compared with when the vehicle 2 is running. Therefore, when it is determined that the velocity v of the vehicle 2 is 0 km/h (YES in Step S17), the ECU 5 proceeds to Step S16. As described above, in Step S16, the ECU 5 makes the display 42 display an alarm and ends the process. That is, when the TTC is equal to or less than 1 second (NO in Step S15), and the vehicle 2 is stopped (YES in Step S17), the ECU 5 does not activate the speaker 41 but activates the display 42 to raise an alarm to the driver of the vehicle 2.

On the other hand, when it is determined in Step S17 that the velocity v of the vehicle 2 is not 0 km/h (NO in Step S17), or in other words, when the vehicle 2 is not stopped, the ECU 5 proceeds to Step S18.

When the vehicle 2 is not stopped, the necessity for alarm is higher than when the vehicle 2 is stopped. In Step S18, the ECU 5 activates the display 42 to display an alarm and activates the speaker 41 to raise an alarm by producing an alarm or other sound in Step S19. That is, when the TTC is equal to or less than 1 second (NO in Step S15), and the vehicle 2 is not stopped (NO in Step S17), the ECU 5 activates the display 42 and the speaker 41 to raise more alarms to the driver of the vehicle 2.

When it is determined in Step S10 that the velocity v of the vehicle 2 does not fall within the predetermined range (NO in Step S10), when it is determined in Step S12 that there is no crossing object (NO in Step S12), or when it is determined in Step S14 that the TTC is not equal to or less than 2 seconds (NO in Step S14), the ECU 5 activates neither the display 42 nor the speaker 41 and ends the process.

Effects and Advantages

For example, when the object is decelerating to temporarily stop, the possibility of the object colliding with the vehicle 2 is lower than when the object is not decelerating. Therefore, according to the first embodiment, when the object is decelerating, the determination and alarm part 52 performs the alarm reduction control to reduce operation of the alarm unit compared with when the object is not decelerating. As a result, more alarms can be raised to the driver of the vehicle 2 when the possibility of the object colliding with the vehicle 2 is relatively high, whereas alarms that can irritate the driver can be reduced when the possibility of the object colliding with the vehicle 2 is relatively low.

When the TTC required for the object to cross the right alarm line 61 or the left alarm line 62 is equal to or less than 2 seconds, the determination and alarm part 52 determines that the object will cross the alarm line within 2 seconds. When the relative velocity is not decreasing, the determination and alarm part 52 determines that the object is moving at a constant velocity and calculates the TTC (TTC1). When the relative velocity is decreasing, the determination and alarm part 52 determines that the object is moving at a constant acceleration and calculates the TTC (TTC2) as the alarm reduction control.

With this arrangement, when the TTC is equal to or less than 2 seconds, the determination and alarm part 52 activates the alarm unit. The way of calculating the TTC varies with the relative velocity of the object with respect to the right alarm line 61 or the left alarm line 62. The TTC2, which reflects the decrease in relative velocity, is greater than the TTC1, which does not reflect the decrease in relative velocity.

Therefore, with the arrangement described above, when the relative velocity of the object with respect to the right alarm line 61 or the left alarm line 62 is decreasing, the determination and alarm part 52 determines whether or not the object will cross the alarm line within 2 seconds based on the TTC2. Since the TTC2 is greater than the TTC1, when the relative velocity of the object with respect to the alarm line is decreasing, the object is less likely to be determined to cross the alarm line within 2 seconds than when the relative velocity is not decreasing. As a result, when the relative velocity of the object with respect to the right alarm line 61 or the left alarm line 62 is decreasing, the determination and alarm part 52 reduces operation of the alarm unit and thereby can reduce alarms that can irritate the driver compared with when the relative velocity is not decreasing.

When the relative velocity is not decreasing, the determination and alarm part 52 sets the length of the right alarm line 61 and the left alarm line 62 at L1. When the relative velocity is decreasing, the determination and alarm part 52 sets the length of the right alarm line 61 and the left alarm line 62 at L2, which is shorter than L1.

With this arrangement, when the relative velocity of the object with respect to the right alarm line 61 or the left alarm line 62 is decreasing, the right alarm line 61 and the left alarm line 62 are shorter than when the relative velocity is not decreasing. Therefore, when the relative velocity is decreasing, the object is less likely to be determined to cross the alarm line within 2 seconds than when the relative velocity is not decreasing. As a result, when the relative velocity is decreasing, the determination and alarm part 52 reduces operation of the alarm unit and thereby can reduce alarms that can irritate the driver compared with when the relative velocity is not decreasing.

The alarm system 1 includes the traffic signal detection part 53 that detects the traffic signal emitted by the traffic light in the direction of traveling of the object. When the traffic light is emitting the stop signal, the determination and alarm part 52 reduces operation of the alarm unit.

With this arrangement, when the object is decelerating in response to the stop signal, operation of the alarm unit can be reduced with reliability.

Second Embodiment

Figure 7:
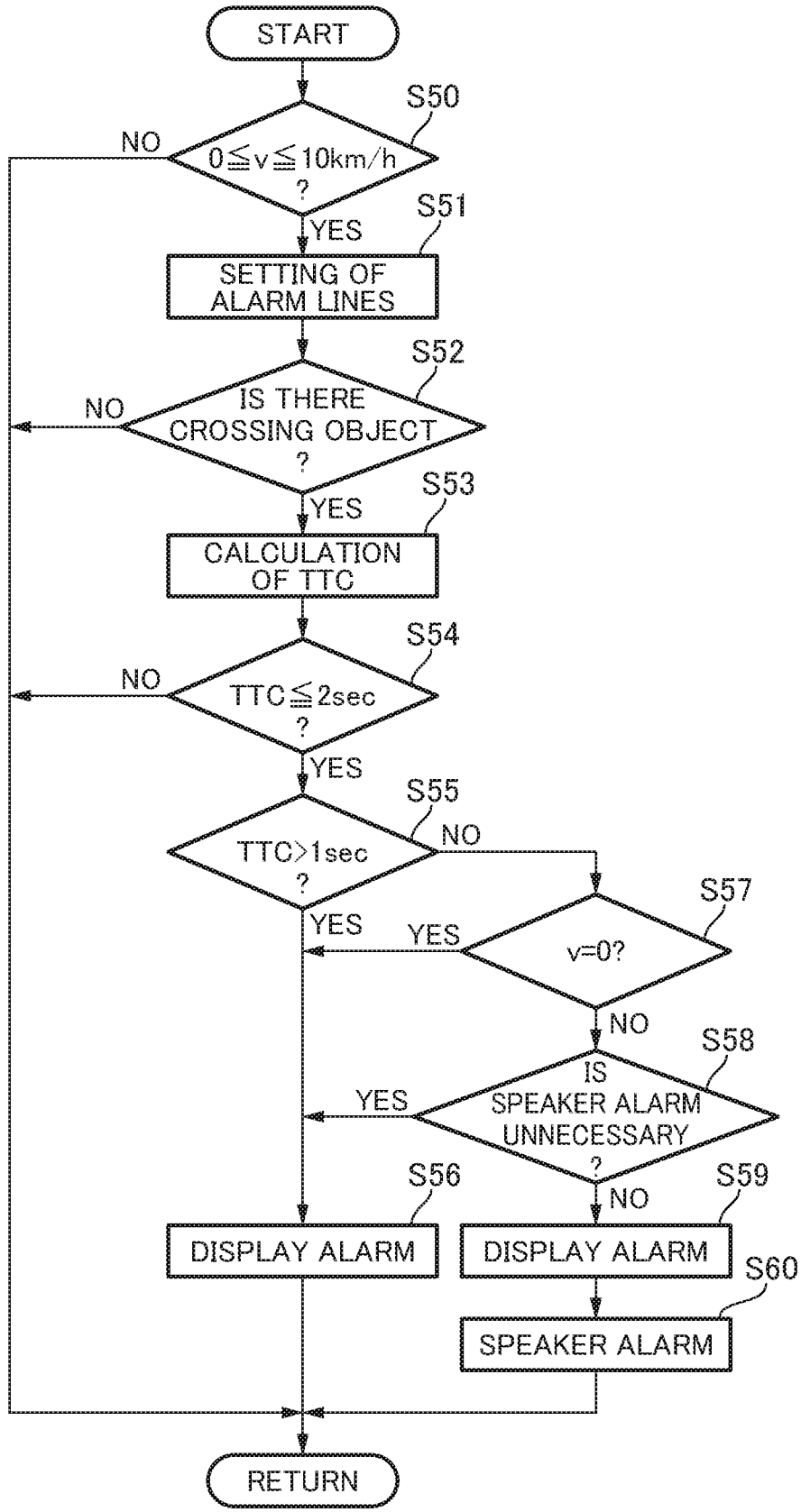
FIG. 7 is a flowchart showing a process performed by an ECU of an alarm system for a vehicle according to a second embodiment.

Next, with reference to FIGS. 7 and 8, an alarm system 10 for a vehicle (referred to simply as an "alarm system 10", hereinafter. See FIG. 1) according to a second embodiment will be described. FIGS. 7 and 8 are flowcharts showing processes performed by the ECU 5 of the alarm system 10 according to the second embodiment.

As with the alarm system 1 according to the first embodiment described above, the alarm system 10 according to the second embodiment is a system that raises an alarm to the driver of the vehicle 2 to alert the driver. Although the alarm system 10 differs from the alarm system 1 according to the first embodiment in the way of setting the alarm lines and the way of calculating the TTC, the alarm system 10 has basically the same configuration as the alarm system 1 according to the first embodiment shown in FIG. 1. Of the components of the alarm system 10 and the controls performed by the alarm system 10, those that are the same as those in the first embodiment are denoted by the same reference numerals, and descriptions thereof will be omitted as appropriate.

In Step S50 shown in FIG. 7, the ECU 5 determines whether or not the velocity v of the vehicle 2 falls within a range from 0 km/h to 10 km/h inclusive. The ECU 5 determines the velocity v of the vehicle 2 based on the signal received from the speed sensor 34 (see FIG. 1). When it is determined that the velocity v falls within the range (YES in Step S50), the ECU 5 proceeds to Step S51.

In Step S51, the ECU 5 sets the right alarm line 61 and the left alarm line 62 (see FIG. 2). Unlike the first embodiment, the length of the right alarm line 61 and the left alarm line 62 is fixed at L1. After completing setting of the right alarm line 61 and the left alarm line 62, the ECU 5 proceeds to Step S52.

In Step S52, the ECU 5 determines whether or not, in the detection region A1 or the detection region A2 (see FIG. 2), there is an object (referred to simply as a "crossing object", hereinafter) whose virtual line extending in the direction of traveling thereof intersects with the right alarm line 61 or the left alarm line 62. The ECU 5 performs the determination based on the signal received from the side radar 31 (see FIG. 1). When it is determined that there is a crossing object (YES in Step S52), the ECU 5 proceeds to Step S53.

In Step S53, the ECU 5 calculates the TTC for the crossing object. The ECU 5 calculates the distance between the crossing object and the right alarm line 61 or the left alarm line 62 and the velocity of the crossing object with respect to the alarm line (that is, the relative velocity) based on the signal received from the side radar. Unlike the first embodiment, the ECU 5 always calculates the TTC according to the formula f1. In other words, the ECU 5 does not use the formula f2 to calculate the TTC. When a plurality of crossing objects are detected, the ECU 5 calculates the TTC for each crossing object. After completing calculation of the TTC, the ECU 5 proceeds to Step S54.

In Step S54, the ECU 5 determines whether or not the TTC calculated in Step S53 is equal to or less than 2 seconds. When it is determined that the TTC is equal to or less than 2 seconds (YES in Step S54), the ECU 5 proceeds to Step S55.

In Step S55, the ECU 5 determines whether or not the TTC calculated in Step S53 is more than 1 second. When the TTC is more than 1 second, the necessity for alarm is relatively low. When it is determined that the TTC is more than 1 second (YES in Step S55), the ECU 5 proceeds to Step S56.

In Step S56, the ECU 5 activates the display 42 (see FIG. 1). Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, when the TTC is equal to or less than 2 seconds (YES in Step S54) and more than 1 second (YES in Step S55), the necessity for alarm is relatively low, so that the ECU 5 does not activate the speaker 41 (see FIG. 1) but activates the display 42 to raise an alarm to the driver of the vehicle 2.

On the other hand, when the TTC is equal to or less than 1 second, the necessity for alarm is relatively high. When it is determined in Step S55 that the TTC calculated in Step S53 is not more than 1 second (NO in Step S55), the ECU 5 proceeds to Step S57.

In Step S57, the ECU 5 determines whether or not the velocity v of the vehicle 2 is 0 km/h. In other words, the ECU 5 determines whether or not the vehicle 2 is stopped. When the vehicle 2 is stopped, the necessity for alarm is relatively low compared with when the vehicle 2 is running. Therefore, when it is determined that the velocity v of the vehicle 2 is 0 km/h (YES in Step S57), the ECU 5 proceeds to Step S56. As described above, in Step S56, the ECU 5 makes the display 42 display an alarm and ends the process. That is, when the TTC is equal to or less than 1 second (NO in Step S55), and the vehicle 2 is stopped (YES in Step S57), the ECU 5 does not activate the speaker 41 but activates the display 42 to raise an alarm to the driver of the vehicle 2.

On the other hand, when it is determined in Step S57 that the velocity v of the vehicle 2 is not 0 km/h (NO in Step S57), or in other words, when the vehicle 2 is not stopped, the ECU 5 proceeds to Step S58.

When the vehicle 2 is not stopped, the necessity for alarm is higher than when the vehicle 2 is stopped. In Step S58, the ECU 5 determines whether or not the alarm from the speaker 41 is necessary. With reference to FIG. 8, a process of the ECU 5 determining the necessity will be described.

In Step S70 shown in FIG. 8, the ECU 5 determines whether or not the vehicle 2 is located in the vicinity of an intersection. The ECU 5 performs the determination based on the signal received from the external camera 32 or the navigation device 33 (see FIG. 1). When it is determined that the vehicle 2 is located in the vicinity of an intersection (YES in Step S70), the ECU 5 proceeds to Step S71.

In Step S71, the ECU 5 determines whether or not a traffic light in the direction of traveling of the crossing object is emitting the stop signal. The ECU 5 performs the determination based on the signal received from the external camera 32 or the navigation device 33 (see FIG. 1). When it is determined that the traffic light is emitting the stop signal (YES in Step S71), the ECU 5 proceeds to Step S72.

In Step S72, the ECU 5 determines whether or not the deceleration of the crossing object is equal to or higher than 5 m/s². 5 m/s² is an example of a predetermined deceleration according to the present invention. The ECU 5 performs the determination based on the signal received from the side radar 31 (see FIG. 1). When it is determined that the deceleration of the crossing object is equal to or higher than 5 m/s² (NO in Step S72), the crossing object is highly likely to stop. Then, the ECU 5 proceeds to Step S73. In Step S73, the ECU 5 determines that the alarm from the speaker 41 is unnecessary.

On the other hand, when it is determined in Step S70 that the vehicle 2 is not located in the vicinity of an intersection (NO in Step S70), when it is determined in Step S71 that the traffic light in the direction of traveling of the crossing object is not emitting the stop signal (NO in Step S71), or when it is determined in Step S72 that the deceleration of the crossing object is not equal to or higher than 5 m/s² (NO in Step S72), the ECU 5 proceeds to Step S74. In Step S74, the ECU 5 determines that the alarm from the speaker 41 is necessary.

Referring to FIG. 7 again, the process performed by the ECU 5 will be described. When it is determined in Step S58 that the alarm from the speaker 41 is unnecessary (YES in Step S58), the ECU 5 proceeds to Step S56.

In Step S56, the ECU 5 activates the display 42. Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, even when the TTC is equal to or less than 1 second (NO in Step S55), when conditions (see FIG. 8) such as that the deceleration of the crossing object is equal to or higher than 5 m/s² are satisfied, the ECU 5 does not activate the speaker 41 but activates the display 42.

On the other hand, when it is determined in Step S58 that the alarm from the speaker 41 is necessary (NO in Step S58), the ECU 5 proceeds to Step S59.

When the TTC is equal to or less than 1 second (NO in Step S55), and conditions (see FIG. 8) such as that the deceleration of the crossing object is equal to or higher than 5 m/s² are not satisfied, the necessity for alarm is relatively high. Then, the ECU 5 activates the display 42 to display an alarm in Step S59, and activates the speaker 41 to produce an alarm or other sound in Step S60.

According to the second embodiment, the control of suppressing operation of the speaker 41 when the deceleration of the object is equal to or higher than 5 m/s² and the traffic light is emitting the stop signal as described above is referred to as the "alarm reduction control".

When it is determined in Step S50 that the velocity v of the vehicle 2 does not fall within the predetermined range (NO in Step S50), when it is determined in Step S52 that there is no crossing object (NO in Step S52), or when it is determined in Step S54 that the TTC is not equal to or less than 2 seconds (NO in Step S54), the ECU 5 activates neither the display 42 nor the speaker 41 and ends the process.

Effects and Advantages

The alarm unit includes the speaker 41, which is the first alarm device, and the display 42, which is the second alarm device. An alarm unit control part 55 activates the speaker 41 and the display 42 when the relative velocity is not decreasing, and does not activate the speaker 41 but activates the display 42 when the relative velocity is decreasing.

With this arrangement, when the object is decelerating (that is, when the possibility of the object colliding with the vehicle 2 is relatively low), the determination and alarm part 52 does not activate the speaker 41, so that alarms that can irritate the driver can be reduced.

The speaker 41, which is the first alarm device, raises an audible alarm. The display 42, which is the second alarm device, raises a visual alarm.

The audible alarm is more likely to irritate the driver than the visual alarm. With the arrangement described above, when the object is decelerating (that is, the possibility of the object colliding with the vehicle 2 is relatively low), the audible alarm is not raised, so that the driver is less likely to be irritated by alarms.

The determination and alarm part 52 reduces operation of the alarm unit when the deceleration of the object with respect to the right alarm line 61 or the left alarm line 62 is equal to or higher than 5 m/s².

With this arrangement, the determination and alarm part 52 can be prevented from reducing operation of the alarm unit in response to a slight decrease in velocity of the object and thereby failing to alert the driver.

According to the second embodiment, of the speaker 41 and the display 42, operation of the speaker 41 is suppressed. However, the reduction of operation of the alarm unit according to the present invention is not limited to this implementation. For example, the reduction of operation of the alarm unit may include changing the volume or pattern of the audible alarm or the color or contents of the visual alarm to reduce irritation to the driver. Furthermore, the alarm unit may be a vibrator that makes the steering wheel or driver's seat in the vehicle vibrate to alert the driver. In that case, as the reduction of operation of the alarm unit, the strength or pattern of the vibration may be changed to reduce irritation to the driver, for example.

REFERENCE SIGNS LIST 1, 10 alarm system for vehicle (alarm system)
2 vehicle
41 speaker (first alarm device)
42 display (second alarm device)
51 object detection part
52 determination and alarm part
53 traffic signal detection part
61 right alarm line (alarm line)
62 left alarm line (alarm line)

What is claimed is:

1. An alarm system for a vehicle, comprising:
an object detection part that detects an object around the vehicle; and
a determination and alarm part that sets an alarm line that extends forward from the vehicle, determines whether or not the object crosses the alarm line within a predetermined time, and activates an alarm unit when it is determined that the object crosses the alarm line within the predetermined time,
wherein, when a relative velocity of the object with respect to the alarm line is decreasing, the determination and alarm part performs an alarm reduction control to reduce operation of the alarm unit compared with when the relative velocity is not decreasing.

2. The alarm system for a vehicle according to claim 1, wherein the alarm unit includes a first alarm device and a second alarm device;
the determination and alarm part activates the first alarm device and the second alarm device when the relative velocity is not decreasing; and
the determination and alarm part does not activate the first alarm device but activates the second alarm device as the alarm reduction control when the relative velocity is decreasing.

3. The alarm system for a vehicle according to claim 2, wherein the first alarm device audibly raises an alarm; and the second alarm device visually raises an alarm.

4. The alarm system for a vehicle according to claim 1, wherein when a time to collision, which is a time required for the object to cross the alarm line, is equal to or less than the predetermined time, the determination and alarm part determines that the object crosses the alarm line within the predetermined time;

the determination and alarm part calculates the time to collision on an assumption that the object is moving at a constant velocity when the relative velocity is not decreasing; and the determination and alarm part calculates the time to collision on an assumption that the object is moving at a constant acceleration as the alarm reduction control when the relative velocity is decreasing.

5. The alarm system for a vehicle according to claim 2, wherein when a time to collision, which is a time required for the object to cross the alarm line, is equal to or less than the predetermined time, the determination and alarm part determines that the object crosses the alarm line within the predetermined time;

the determination and alarm part calculates the time to collision on an assumption that the object is moving at a constant velocity when the relative velocity is not decreasing; and the determination and alarm part calculates the time to collision on an assumption that the object is moving at a constant acceleration as the alarm reduction control when the relative velocity is decreasing.

6. The alarm system for a vehicle according to claim 3, wherein when a time to collision, which is a time required for the object to cross the alarm line, is equal to or less than the predetermined time, the determination and alarm part determines that the object crosses the alarm line within the predetermined time;

the determination and alarm part calculates the time to collision on an assumption that the object is moving at a constant velocity when the relative velocity is not decreasing; and the determination and alarm part calculates the time to collision on an assumption that the object is moving at a constant acceleration as the alarm reduction control when the relative velocity is decreasing.

7. The alarm system for a vehicle according to claim 1, wherein the determination and alarm part sets a length of the alarm line at a first length when the relative velocity is not decreasing; and the determination and alarm part sets the length of the alarm line at a second length, which is shorter than the first length, as the alarm reduction control when the relative velocity is decreasing.

8. The alarm system for a vehicle according to claim 2, wherein the determination and alarm part sets a length of the alarm line at a first length when the relative velocity is not decreasing; and the determination and alarm part sets the length of the alarm line at a second length, which is shorter than the first length, as the alarm reduction control when the relative velocity is decreasing.

9. The alarm system for a vehicle according to claim 3, wherein the determination and alarm part sets a length of the alarm line at a first length when the relative velocity is not decreasing; and the determination and alarm part sets the length of the alarm line at a second length, which is shorter than the first length, as the alarm reduction control when the relative velocity is decreasing.

10. The alarm system for a vehicle according to claim 1, wherein the determination and alarm part performs the alarm reduction control when a deceleration of the object with respect to the alarm line is equal to or higher than a predetermined deceleration.

11. The alarm system for a vehicle according to claim 2, wherein the determination and alarm part performs the alarm reduction control when a deceleration of the object with respect to the alarm line is equal to or higher than a predetermined deceleration.

12. The alarm system for a vehicle according to claim 3, wherein the determination and alarm part performs the alarm reduction control when a deceleration of the object with respect to the alarm line is equal to or higher than a predetermined deceleration.

13. The alarm system for a vehicle according to claim 1, further comprising a traffic signal detection part that detects a traffic signal emitted by a traffic light in the direction of traveling of the object, wherein the determination and alarm part performs the alarm reduction control when the traffic light is emitting a stop signal.

14. The alarm system for a vehicle according to claim 2, further comprising a traffic signal detection part that detects a traffic signal emitted by a traffic light in the direction of traveling of the object, wherein the determination and alarm part performs the alarm reduction control when the traffic light is emitting a stop signal.

15. The alarm system for a vehicle according to claim 3, further comprising a traffic signal detection part that detects a traffic signal emitted by a traffic light in the direction of traveling of the object, wherein the determination and alarm part performs the alarm reduction control when the traffic light is emitting a stop signal.

\* \* \* \* \*